No. 752,090. PATENTED FEB. 16, 1904.
N. C. MILLER.
HORSESHOE.
APPLICATION FILED MAR. 27, 1902.
NO MODEL.

Witnesses
Howard W. Orr
H. J. Shepard

Inventor,
Nicholas C. Miller,
By E. G. Siggers
Attorney

No. 752,090. Patented February 16, 1904.

UNITED STATES PATENT OFFICE.

NICHOLAS C. MILLER, OF DODGEVILLE, WISCONSIN.

HORSESHOE.

SPECIFICATION forming part of Letters Patent No. 752,090, dated February 16, 1904.

Application filed March 27, 1902. Serial No. 100,261. (No model.)

*To all whom it may concern:*

Be it known that I, NICHOLAS C. MILLER, a citizen of the United States, residing at Dodgeville, in the county of Iowa and State of Wisconsin, have invented a new and useful Horseshoe, of which the following is a specification.

This invention relates to horseshoes, and has for its object to provide for securing shoes to hoofs without driving nails or other fastenings into the hoofs, and thereby to avoid damaging the latter and also to greatly facilitate the application of the shoe.

It is furthermore designed to arrange the fastening portions of the shoe for convenient manipulation without requiring any particular skill or experience in order that the shoes may be conveniently fitted to an animal when required for use and may be removed when not needed—as, for instance, when the animal is standing in a stall.

Another object is to provide for the convenient attachment and detachment of toe and heel calks.

A further object is to have the attaching means at the heel of the shoe adjustable longitudinally of the shoe, so as to accommodate the device to hoofs of different sizes.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

Figure 1:
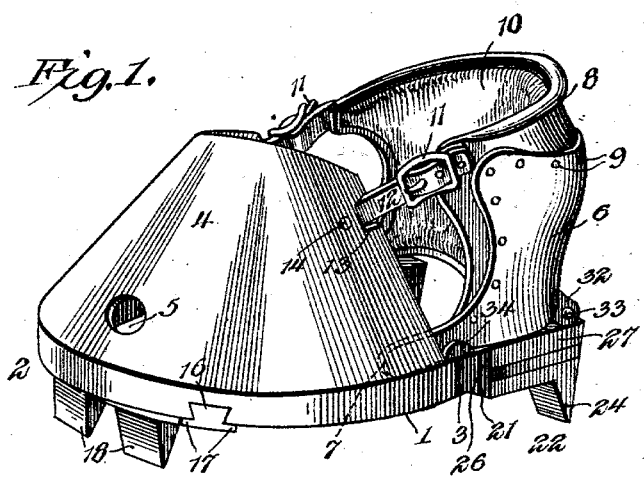
Figure 8:
Figure 7:
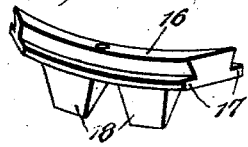
Figure 2:
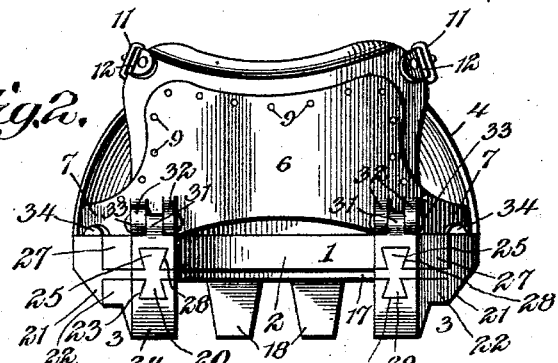
Figure 4:
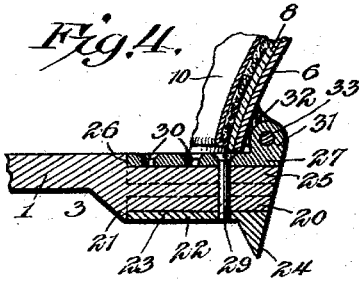
Figure 3:
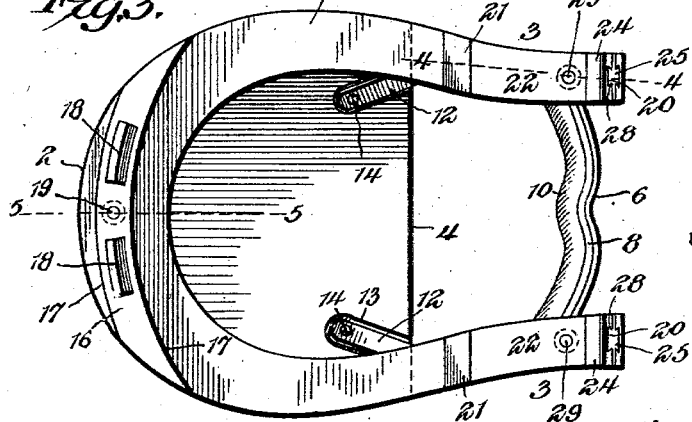
Figure 5:
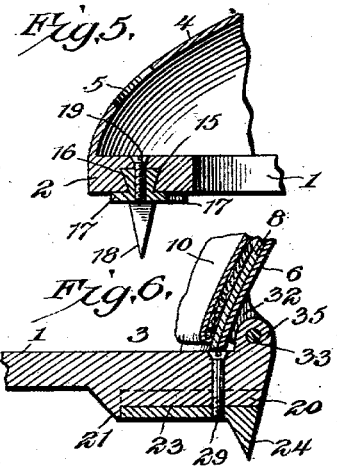
Figure 6:
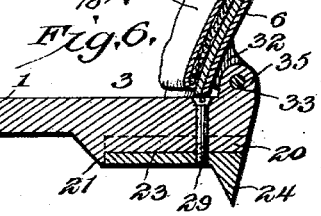

In the drawings, Figure 1 is a perspective view of a horseshoe embodying the several improvements of the present invention. Fig. 2 is a rear elevation thereof. Fig. 3 is a bottom plan view. Fig. 4 is a detail sectional view on the line 4 4 of Fig. 3. Fig. 5 is a detail sectional view on the line 5 5 of Fig. 3. Fig. 6 is a detail sectional view similar to Fig. 4, showing the heel-piece hinged directly to the heel of the shoe. Fig. 7 is a detail perspective view of the toe-calk. Fig. 8 is a detail perspective of one of the heel-calks.

Like characters of reference designate corresponding parts in all the figures of the drawings.

In carrying out the present invention I employ a shoe 1 of substantially the conventional form, with the exception that the toe portion 2 is somewhat wider than usual and the heel portions 3 instead of converging are projected rearwardly in substantial parallelism. At the toe of the shoe there is an upstanding toe-cap 4, which is either integral with the shoe or fastened thereto in any suitable manner, the front of the cap being inclined upwardly and rearwardly at the usual inclination of the front of the hoof. The rear edge of the cap extends to a point beyond the middle of the shoe and is inclined upwardly and forwardly. In the front of the cap and adjacent to the lower end thereof there is formed an opening 5 for a purpose as will be hereinafter explained.

A metallic heel-piece 6 extends across the rear end of the shoe and is hinged to the respective heel portions thereof, as will be hereinafter explained. This heel-piece is bowed and of a general shape to snugly fit the rear of a hoof and has its lower edge provided with forwardly-directed extensions or tongues 7 of a length to overlap the toe-cap and fit between the latter and the hoof, so as to prevent lateral displacement of the lower forward edge of the heel-piece and to take considerable strain from the hinged connection between the heel-piece and the heel of the shoe. The metallic heel-piece 6, which extends in front of the hinge or pivotal point, as hereinafter explained, is arranged to engage the upper face of the shoe, whereby the inward movement of the heel-piece is limited. To the inner side of this heel-piece is snugly fitted a lining 8, preferably of leather and fastened by means of rivets 9, said leather lining projecting above the upper edge and beyond the front edge of the metallic heel-piece, so as to prevent chafing of the hoof. Suitable padding 10 is applied to the leather, so as to give ease and comfort to the animal, to prevent the hoof from being chafed by the heel-piece, which is movable inward and outward toward and from the toe-cap. At each side of the leather lining and to the forward upper portion thereof is secured a buckle 11, with which is adjustably and detachably engaged the rear end of a leather strap 12, which is secured within a recess 13, formed in the inner side of the toe-cap 4 and held in place by means of a rivet or other fastening 14. It is preferable to fasten the strap within the recess 13 in order that it may lie substantially in the plane of the inner side of the toe-cap, and thereby in close proximity to the hoof.

In applying the shoe it will be understood that the opposite straps 12 are first disengaged from the buckles, so that the heel-piece may be thrown backwardly upon its hinge connection with the shoe in order that the toe-cap 4 may be readily fitted to the toe of the hoof, after which the heel-piece is swung into engagement with the rear portion of the hoof, with the tongues 7 lying between the hoof and the toe-cap, and then the straps 12 are drawn tight and engaged with the buckles, whereby the shoe is conveniently and effectively fastened to the hoof without driving fastenings into or otherwise damaging the hoof and may be conveniently removed whenever desired.

In order that the shoe may be equipped with calks, the under side of the toe portion of the shoe is provided with a transversely-disposed arcuate dovetailed groove 15, which has its opposite ends opening outwardly through the opposite edges of the shoe, and by means of this groove the toe-calk may be secured to the shoe. The toe-calk preferably embodies a dovetailed arcuate body portion 16, which is slid endwise into the groove 15, and is provided at its narrowest portion with opposite longitudinal flanges 17 to lie flat against the under side of the shoe and brace the calk, there being one or more pointed projections 18 depending from the body of the calk and forming the calks proper. A screw-threaded fastening 19 is set downwardly through corresponding openings in the toe of the shoe and the body of the calk, these openings being in vertical alinement with the opening 5 in the toe-cap of the shoe, so as to give convenient access to the screw-threaded fastening. It will here be noted that the hoof covers and bears downwardly upon this fastening, so as to effectually prevent displacement thereof when the shoe is in use. Each heel portion of the shoe is also provided with a removable calk, and, as indicated in Figs. 1 to 4, inclusive, each heel portion of the shoe is reduced upon the lower side thereof and provided with a longitudinally-disposed dovetailed rib 20, which terminates at its inner end in a pendent shoulder 21, extending transversely across the heel portion. The body 22 of the heel-calk is provided in its upper face with a longitudinal open-ended dovetailed groove 23 to snugly receive the dovetailed rib 20, and at the rear of this body is a pendent calk 24. The upper side of the heel portion of the shoe is also reduced and provided with a longitudinal dovetailed rib 25, which extends rearwardly from the shoulder 26, formed by the reduction of the shoe. An extensible heel-plate 27, having an open-ended longitudinal dovetailed groove 28 in its under side, is fitted to the rib 25 and against the shoulder 26, and a screw-threaded fastening 29 is set downwardly through the corresponding openings in the extensible heel-plate, the heel portion of the shoe, and the body of the calk, whereby the plate and calk are effectually held against endwise movement and displacement. The extensible heel-plate is provided with a longitudinal series of perforations 30 in order that the heel-plate may be extended rearwardly to accommodate the shoe to hoofs of different sizes.

In the extensible form of shoe the heel-piece 6 is hinged to the extensible plates, so as to be adjustable therewith, and to accomplish this each plate is provided at its rear end with an eye or knuckle 31, and the rear bottom edge of the heel-piece is provided with a pair of eyes or knuckles 32 to embrace the eye 31, and a suitable pivot-pin 33 is passed through these alined eyes, so as to form a pivotal or hinged connection between the heel-piece and the heel of the shoe. The sides of the metallic heel-piece 6 extend in advance of the pivot-pins 33 and engage the upper face of the shoe for limiting the inward movement of the said heel-piece.

As clearly shown in Fig. 1, it will be seen that each side of the shoe is provided at the heel portion thereof with an upstanding lip or projection 34, which is designed to lie against the adjacent outer side of the heel-piece at a point between the toe-cap and the hinged connection, so as to form an additional brace to prevent lateral movement of the heel-piece and to remove strain from the hinges.

In some instances it may be desirable to omit the extensible heel-plates, and in such an event the heel-piece is hinged directly to the heel portions of the shoe, as indicated in Fig. 6, wherein the eye 35 is formed directly upon the heel-piece, and the ears 32 of the heel-piece are engaged therewith, as described, for the adjustable form of the shoe.

In order that the upper edge of the heel-piece may not chafe the leg of the animal, it is rolled over or beaded externally, as clearly shown in Figs. 1 and 2 of the drawings, and the heel-piece is also provided upon its inner side with an upstanding rib or bulged portion, as best indicated in Fig. 3, so as to more snugly fit the contour of the back of the foot.

From the foregoing description it is apparent that the present form of shoe may be applied and removed without the assistance of a blacksmith, and therefore shoes may be applied to an animal only when absolutely required and may be removed when not needed—as, for instance, when the animal is standing in a stall or when turned out in the field to graze. By frequently removing the shoes the life of the latter will be materially increased, and it will also be found that the hoofs of the animal will be greatly benefited, as they are then fully exposed, so that they may be cleansed and softened in a more thorough manner than when shoes are permanently nailed to the hoof. Furthermore, the hoof is not marred and broken.

What I claim is—

1. A horseshoe having a toe-cap, a heel-piece extending transversely between the heel portions of the shoe and shaped to conform to the rear of the hoof of an animal, said heel-piece being movably connected with the shoe and arranged to engage the same, whereby its inward or forward movement is limited, and fastenings carried by one of the members and having adjustable connections with the other member.

2. A horseshoe having a toe-cap, a hinged heel-piece extending between the heel portions of the shoe and arranged to engage the latter, whereby its inward or forward movement is limited, and a detachable connection between the heel-piece and toe-cap.

3. A horseshoe having a toe-cap, a heel-piece shaped to conform to the rear of a hoof, and an adjustable connection between these members, one of the members being hinged to the shoe and having its inward movement limited by the same.

4. A horseshoe having a toe-cap, a heel-piece shaped to conform to the rear of a hoof, and an adjustable connection between these members, one of the members being adjustably connected to the shoe and having its inward movement limited by the same.

5. A horseshoe having a toe-cap, a heel-piece shaped to conform to the back of a hoof and movably connected with the shoe and arranged to engage the upper face thereof, whereby its inward movement is limited, buckles carried by one of these members, and straps carried by the other member and disposed for adjustable engagement with the respective buckles.

6. A horseshoe having a toe-cap, a heel-piece hinged to the shoe and shaped to conform to the back of a hoof, said heel-piece being arranged to engage the upper face of the shoe, whereby its inward movement is limited, buckles carried by the opposite forward portions of the heel-piece, and straps carried by the toe-cap and disposed for engagement with the respective buckles.

7. A horseshoe having a toe-cap, a heel-piece shaped to conform to the back of a hoof, one of these members being rigidly connected to the shoe and the other having a hinged connection therewith and arranged to engage the same, whereby its inward movement is limited, and means for fastening the hinged member in snug engagement with a hoof.

8. A horseshoe having a toe-cap, a heel-piece shaped to conform to the back of a hoof, one of these members being hinged to the shoe and overlapping the other member upon the inner side thereof so as to be braced thereby, and means for fastening the hinged member in snug engagement with a hoof.

9. A horseshoe having a rigid toe-cap, a hinged heel-piece shaped to conform to the back of a hoof and having its forward portion extended to overlap the toe-cap upon the inner side thereof so as to brace the heel-piece, and means for fastening the heel-piece in snug engagement with a hoof.

10. A horseshoe having a rigid toe-cap, a hinged heel-piece shaped to conform to the back of a hoof and having opposite forwardly-directed extensions overlapping the toe-cap upon the inner side thereof to brace the heel-piece, and adjustable fastening means between the toe-cap and the heel-piece.

11. A horseshoe having a toe-cap, a heel-piece shaped to conform to the back of a hoof, one of these members being hinged to the shoe, opposite upstanding lips or flanges carried by the shoe and overlapping opposite sides of the hinged member to brace the latter, and means for fastening the hinged member in snug engagement with a hoof.

12. A horseshoe having a rigid toe-cap, a hinged heel-piece shaped to conform to the back of a hoof, and provided with forward extensions overlapping the inner side of the rigid toe-cap, upstanding lips or flanges rising from the shoe and embracing opposite sides of the heel-piece, and means for fastening said heel-piece in snug engagement with the back of a hoof.

13. A horseshoe having a rigid toe-cap, a hinged heel-piece shaped to conform to the back of a hoof and having lower forwardly-projected portions to overlap the inner side of the toe-cap, upstanding lips or flanges carried by the opposite rear portions of the shoe and embracing opposite sides of the heel-piece to brace the same, buckles carried by opposite sides of the heel-piece, and straps carried by opposite sides of the toe-cap and disposed for adjustable engagement with the respective buckles.

14. A horseshoe having a toe-cap, and a heel-piece, one of these members being hingedly mounted and extensible to accommodate the shoe to hoofs of different sizes.

15. A horseshoe having a heel-piece hingedly mounted and extensible longitudinally of the shoe to accommodate the same to hoofs of different sizes.

16. A horseshoe having longitudinally-extensible heel members, and a heel-piece hingedly connected to and movable with the heel members and shaped to conform to the back of the hoof.

17. A horseshoe having extensible heel members, and a heel-piece hinged to the extensible heel members and movable therewith and shaped to conform to the back of the hoof.

18. A horseshoe having extensible heel members, said extensible members having tongue-and-groove connections with the shoe, and a hingedly-mounted heel-piece carried by the extensible heel members.

19. A horseshoe having extensible heel members with tongue-and-groove connections between the heel members and the shoe, each heel portion of the shoe having an opening, and each extensible member having a plurality of openings for alinement with the opening in the shoe, fastenings to engage the openings of the extensible members and the shoe, and a heel-piece carried by the extensible members.

20. A horseshoe having the thickness of its heel portions reduced, with longitudinal dovetailed ribs formed upon the reduced portions, extensible heel members provided with longitudinal dovetailed grooves for the reception of the respective ribs, and a heel-piece carried by the extensible members.

21. A horseshoe having extensible heel members, a heel-piece carried by the heel members, removable heel-calks, and fastenings common to the extensible heel members and calks.

22. A horseshoe having extensible heel members applied to the tops of the heel portions of the shoe, a heel-piece carried by the heel members, heel-calks applied to the under side of the heel portions of the shoe, and fastenings piercing the extensible members, the respective heel portions and the heel-calks.

23. A horseshoe having extensible heel members applied to the tops of the heel portions of the shoe, a heel-piece carried by the extensible members, heel-calks applied to the under sides of the heel portions of the shoe, and fastenings piercing the heel members, the heel portions of the shoe and the heel-calks.

24. A horseshoe having extensible heel members applied to the tops of the heel portions thereof, a heel-piece hinged to the extensible heel members and shaped to conform to the back of a hoof, heel-calks applied to the under sides of the heel portions of the shoe, fastenings piercing the extensible members, the heel portions of the shoe and the heel-calks, and means for fastening the hinged heel-piece in snug engagement with the back of a hoof.

25. A horseshoe having longitudinal ribs upon the tops and bottoms of the heel portions thereof, extensible heel members having grooves receiving the upper ribs, a heel-piece carried by the extensible heel members, heel-calks having longitudinal grooves receiving the ribs upon the under side of the shoe, and fastenings piercing the extensible members, the heel portions of the shoe and the heel-calks.

26. A horseshoe having the tops and bottoms of its heel portions reduced to form transverse shoulders at the inner ends of the reduced portions, longitudinal ribs upon the tops of the reduced portions, extensible heel members having grooves receiving the respective ribs, and limited in their inward movements by the upper transverse shoulders, a heel-piece carried by the extensible members, heel-calks applied to the reduced under sides of the heel portions of the shoe and abutted against the lower transverse shoulders, and fastenings piercing the extensible members, the reduced heel portions of the shoe and the heel-calks.

27. A horseshoe provided with a rigid metallic toe-cap, a metallic heel-piece movable toward and from the toe-cap and shaped to conform to the back of a hoof, and a flexible lining projected above the heel-piece and arranged to engage the back of the hoof to prevent the same from being chafed by the inward movement of the heel-piece, substantially as described.

28. A horseshoe provided with a metallic toe-cap, a hinged metallic heel-piece mounted on the shoe and movable toward and from the toe-cap, a flexible lining projected above the upper edge of the heel-piece and arranged to engage the back of a hoof to prevent the same from being chafed by the inward movement of the said heel-piece, buckles carried by the projected portions of the lining, and straps secured to the toe-cap and arranged to engage the buckles, substantially as described.

In testimony that I claim the foregoing as my own I have hereto affixed my signature in the presence of two witnesses.

NICHOLAS C. MILLER.

Witnesses:
D. H. WILLIAMS,
I. C. PENBERTTRY.